US007031968B2

(12) United States Patent
Kremer et al.

(10) Patent No.: US 7,031,968 B2
(45) Date of Patent: Apr. 18, 2006

(54) METHOD AND APPARATUS FOR PROVIDING WEB SITE PREVIEW INFORMATION

(75) Inventors: Oren Kremer, Tel-Aviv (IL); Amiram Aricha, Tel-Aviv (IL)

(73) Assignee: Prev-U Israel Ltd., Tel Aviv (IL)

( * ) Notice: Subject to any disclaimer, the term of this patent is extended or adjusted under 35 U.S.C. 154(b) by 755 days.

(21) Appl. No.: 09/755,952

(22) Filed: Jan. 5, 2001

(65) Prior Publication Data

US 2002/0073058 A1    Jun. 13, 2002

Related U.S. Application Data

(63) Continuation-in-part of application No. 09/732,176, filed on Dec. 7, 2000, now abandoned.

(51) Int. Cl.
*G06F 7/00* (2006.01)
(52) U.S. Cl. .............................. 707/100; 707/3; 707/10
(58) Field of Classification Search .................... 707/1, 707/3, 10, 100, 104; 345/744, 745; 705/27
See application file for complete search history.

(56) References Cited

U.S. PATENT DOCUMENTS

| | | | | | |
|---|---|---|---|---|---|
| 5,781,909 | A | * | 7/1998 | Logan et al. ................ | 707/200 |
| 5,983,245 | A | * | 11/1999 | Newman et al. ............. | 707/513 |
| 6,011,537 | A | * | 1/2000 | Slotznick ..................... | 345/115 |
| 6,094,684 | A | * | 7/2000 | Pallmann ..................... | 709/227 |
| 6,101,509 | A | * | 8/2000 | Hanson et al. ............... | 707/513 |
| 6,144,991 | A | * | 11/2000 | England ....................... | 709/205 |
| 6,161,137 | A | * | 12/2000 | Ogdon et al. ................ | 709/224 |
| 6,189,018 | B1 | * | 2/2001 | Newman et al. ............. | 707/501 |
| 6,263,313 | B1 | * | 7/2001 | Milsted et al. ................ | 705/1 |
| 6,263,501 | B1 | * | 7/2001 | Schein et al. ................. | 725/39 |
| 6,308,188 | B1 | * | 10/2001 | Bernardo et al. ........... | 707/530 |

(Continued)

*Primary Examiner*—Sam Rimell
(74) *Attorney, Agent, or Firm*—Darby & Darby

(57) ABSTRACT

Client-server system for providing web site preview information of web site content and features to users. The user enters a web site URL they want to preview into a client application, which generates preview information about the web site content and features. The client generates the web site preview information by building the preview information from preview information sources including the web site and/or requesting preview information from the server/back-end of the client-server system. Both the client and the server build preview information by accessing preview information sources such as web pages and web page information databases, extracting the requested preview information, formatting the preview information in a standard preview format, and returning the preview information to the user for display. While the client and server system build preview information from preview information sources in real-time, the server system also builds preview information in non-real-time by storing preview information in a preview information archive, and transmitting this pre-built preview information to clients in response to client preview information requests. In addition to providing web site preview information, the present invention may also be used to provide real-time or near real-time promotional information associated with a web site. The promotional information or announcement may be provided in conjunction with the preview information presented to the user. Specifically, when the user requests or is provided with preview information for a particular web site, the system "goes" to the web site and retrieves announcement information prepared by the web site sponsor. The announcement information may be in the form of an HTML file prepared by the web site's owner or marketing/promotional team. The HTML file is then presented to the user in conjunction with the presentation of the web site preview information.

50 Claims, 11 Drawing Sheets

U.S. PATENT DOCUMENTS

| | | |
|---|---|---|
| 6,308,327 B1 * | 10/2001 | Liu et al. ....................... 725/37 |
| 6,313,855 B1 * | 11/2001 | Shuping et al. ............. 345/854 |
| 6,330,575 B1 * | 12/2001 | Moore et al. ............... 707/513 |
| 6,345,256 B1 * | 2/2002 | Milsted et al. ................. 705/1 |
| 6,353,448 B1 * | 3/2002 | Scarborough et al. ...... 345/744 |
| 6,601,057 B1 * | 7/2003 | Underwood et al. ........... 707/1 |
| 2003/0014415 A1 * | 1/2003 | Weiss et al. .................. 707/10 |

* cited by examiner

METHOD AND APPARATUS FOR PROVIDING WEB SITE PREVIEW INFORMATION

CROSS REFERENCE TO RELATED APPLICATION

This is a continuation-in-part of U.S. application Ser. No. 09/732,176, filed Dec. 7, 2000 now abandoned, the disclosure of which is incorporated herein by reference.

FIELD OF THE INVENTION

The present invention generally relates to the use of web page information. More specifically, the present invention relates to providing web page preview information, via a method and apparatus that explores a web page, records information about the web page content and features, supplements this information with additional information from sources outside the web page, and presents this information to users as a preview of the web page, thereby enabling users to determine if they are interested in accessing the web page without actually visiting the web page.

BACKGROUND OF THE INVENTION

The Internet has created a wealth of knowledge and information on a scale previously unimaginable. From commercial web pages to individual homepages, government resources to educational institutions, web surfers are exposed to a vast array of web sites that vary in content, form, speed, and design. The gateways to these web sites and their web pages are Uniform Resource Locators (URLs), more commonly known as web addresses, which identify web page locations to users worldwide.

Web users access a web site by entering the web site's URL into a web browser, such as NETSCAPE NAVIGATOR and MICROSOFT INTERNET EXPLORER. Web browsers allow users to enter URLs via a number of traditional methods. First, the user can enter a URL directly into an address blank in a location toolbar. Second, the user can select a URL from a list of web site URLs using pull-down menus or bookmark lists. Finally, users can select a URL link within the main browser window.

Unfortunately, none of these methods allow a user to determine a web site's content or features prior to accessing the web site. Entering a URL into a browser address blank immediately sends the user to the web site. Selecting a URL from a pull-down menu or a bookmark list requires the user to visit the web site on a prior occasion and add the URL to the pull-down menu or bookmark list. Selecting a URL link in the main browser window also sends the user immediately to the web site. None of these web page access methods provide any significant preview information about the web site content or features prior to user access of the web site. At most, these methods indicate web site content prior to user web page access only by presenting a descriptive name for a URL and a few lines of text underneath a URL link; none of these methods provide significant or detailed information about the web site features prior to user access of the web site.

For users seeking web sites with certain content or features, or attempting to avoid web sites with certain content or features, this paucity of information prior to accessing a web site is a constant source of frustration and inefficiency. Users stumble blindly from web site to web site, sifting through vast quantities of useless, incorrect, or outdated information.

Users often attempt to circumvent these difficulties by using search engines to generate a narrow list of web addresses according to specific criteria. Common Internet search engines such as ALTAVISTA, EXCITE, LYCOS, HOTBOT, and YAHOO prompt the user to enter descriptive words and phrases which are used to search and compile a list of web sites. The search engines return a list of web addresses that purportedly fulfill the user's criteria and contain information they desire to view.

Nonetheless, search engines fail to overcome many of the problems stated above due to the lack of web site preview information that describes web site content and features prior to user access of a web site. Each list entry returned by a search engine contains a web site URL and, optionally, a few lines of text copied from the web site's first page. Thus, the user immediately faces a problem in that they cannot tell if the URL list returned by the search engine is truly responsive to the user's criteria.

This problem of determining if the URL list returned by a search engine is responsive to the user's criteria becomes a serious issue due to the process employed by search engines. Search engines traditionally operate by allowing web site owners to register words and phrases that will generate "hits" on their web pages. There is often no correlation between the words registered and actual web page content, however, because web site owners register the most commonly searched words in order to maximize the number of hits on their web pages. As a result, the URL list returned by search engines often bears little or no correlation to the search terms input by the user. Taking into account that search engines only return a list of web site URLs, without any additional information about the web site content or features, the user is deceived into exploring numerous web pages and web sites that are irrelevant to their search. Thus, even by using a search engine, the user wastes time and effort, and becomes frustrated, as they select web site URLs which are irrelevant, outdated, and contain undesired information.

Even if a search engine generates an accurate list of relevant web site URLs, such lists are often extensive and have a broad spectrum of utility and coverage. Users do not have the time or resources to visit every web site to determine which web site best fits their needs. Yet without any additional information about the web sites, the user is forced to investigate each and every one, never able to determine the most relevant web site(s) that suits their needs. Thus, the lack of preview information about web site content and features once again forces the user to waste time and effort viewing numerous web sites instead of being able to immediately identify the web site that best suits their needs.

Finally, assuming the user can use a search engine or some other method to generate a list of web site URLs with equally relevant content, the user is still unable to determine significant web site features essential to saving time and alleviating frustration. Critical features such as the web site connection speed and last time updated are unavailable to the user prior to accessing the web site, causing the user to endure slow data connections and outdated information. Web site security features may also have a significant bearing on which web sites the user is permitted to access. None of these features are evident prior to user access of the web site, and so the user learns these important features at the expense of time, efficiency, and frustration.

SUMMARY OF THE INVENTION

These and other problems with the methods for users to determine web site content prior to accessing the web site are addressed by the present invention, which provides web site preview information to web users. It should be understood that the term web site includes web sites that are comprised of individual web pages, and standalone web pages that are not organized under a particular web site. Thus, the present invention provides preview information to web users that includes global web site features applicable to a multitude of web pages, individual web page features from organized and structured web sites, and features of individual web pages that are not associated with other web pages or organized under a particular web site.

The present invention creates preview information which supplements a web site URL by generating an information synopsis about the web site content and features. Users examine this preview information to determine if they desire to visit a web site without accessing the web site itself. Thus, users are not forced to select a web address, access a web site, explore the web site, and decide if its content or features make it desirable or undesirable to the user. Instead, the user saves time and energy while avoiding frustration and offense by using web site preview information to bypass web sites with irrelevant, outdated, insufficient, or inappropriate content. Thus, web site preview information includes information about the overall features of the web site, and information about individual web pages within the web site.

It should be understood that the terms "build" or any derivative thereof refers to the process of the present invention wherein the system and/or a component of the system examines a preview information source, and then extracts preview information from the preview information source. It should be also understood that the terms "fetch" and any derivative thereof refers to the process of the present invention wherein one part or component of the system requests preview information from another part or component either within or without the system. It should be further understood that the term "generate" and any derivative thereof refers to the process of the present invention wherein the system, or a component of the system, generates preview information by building the preview information from a preview information source, and/or by fetching preview information from another part or component of the system.

According to the present invention, a user first requests preview information for a web site from the system. Second, the system generates a preview information package for the web site that includes the preview information requested by the user. The system generates preview information by building preview information from a preview information source, and by fetching preview information from other parts of the system. The system builds preview information by examining preview information sources, including the web site specified, and extracting relevant preview information, which may be displayed in real-time and/or stored in a preview information archive. The system fetches preview information by requesting preview information from other components, which build the preview information in real-time and/or fetch the preview information from other components including preview information archives. Third, the system sends the user the web site's preview information package. Fourth, the user examines the preview information package to evaluate web site content and features, and determines whether or not they want to access the web site.

One apparatus used to implement this system is a client-server computer system. The client's primary function is to field user preview information requests, generate preview information about web site content and features, compile the preview information into a preview information package, and display the preview information package to the user. The server system functions as the client "back-end" by accepting client requests for preview information, generating preview information about web site content and features, and returning preview information to the client application. Thus, the server system offloads part of the burden to generate preview information from the client applications.

On the client side, a user enters the URL for a web site they want to preview. The client receives the user's preview information request and generates a preview information package, which is a data package describing the web site content and features. Web site content and features in the preview information package include the web site's thumbnail image, links and files, textual content, last time updated, financial and security features, and connection speed. The client displays the preview information package to the user, who examines its information and determines if they want to visit the web site summarized by the preview information package.

On the server or back-end side, the server system supports multiple client applications by receiving preview information requests from client applications, generating the requested preview information, and returning the preview information to the client. The server system also has a list of web sites for which to build preview information, as well as rules for how often to build preview information for these web sites. The server system uses these web sites and rules to build and store web site preview information in a preview information archive, thereby creating and updating the archive contents. A preview information archive acts as a source of pre-built preview information, which can be fetched by the server system and returned to client applications. Using this source, the server system may respond to client preview information requests by fetching and returning preview information from the preview information archive. The preview information archive also stores additional user identification and URL information to track user activities.

Both the client and server contain a page profile module, which is the module that generates preview information by building preview information and/or fetching preview information. The page profile module receives preview information requests, generates preview information packages, and returns the preview information packages to the user and/or preview information archives. A preview information request is a request to generate preview information that includes the web site URL for which the preview information is to be generated. The page profile module generates preview information by building preview information from preview information sources and/or fetching preview information from other sources. The page profile module determines whether to build or fetch preview information based on its configuration settings.

On the client side, the user generates preview information requests, which are sent to the client page profile module. The client page profile module receives the preview information request and generates a preview information package that includes the preview information requested by the user. The client page profile module generates the preview information package by performing real-time builds of preview information from preview information sources, and/or fetching preview information from the server system/back-end through preview information requests sent to the server system/back-end. The client page profile module returns the preview information package which is displayed to the user.

On the server system/back-end side, the server receives client preview information requests and sends them to the server page profile module. The server page profile module generates and sends preview information packages to the clients, thereby reducing the client burden of generating preview information packages. The server page profile module generates preview information packages by building preview information from preview information sources in real-time and/or fetching pre-built preview information from a preview information archive.

The client page profile module builds preview information packages in real-time by responding to a user preview information request, extracting preview information from preview information sources, and including the extracted information in the preview information package returned to the user. The server page profile module builds preview information packages in real-time and/or non-real time. For real-time builds, wherein the information requested is immediately returned to the user, the server page profile module receives a preview information request from a client, builds the preview information package from preview information sources, and returns the preview information package to the client. For non-real-time builds, wherein the information requested is stored in a preview information archive, the server page profile module receives a preview information request from the server update module and/or client application, builds a preview information package, and stores the preview information package in a preview information archive. Thus, the server page profile module can build preview information in real-time and non-real-time simultaneously by receiving a client preview information request, building the requested preview information, returning the preview information to the client, and also storing the preview information in a preview information archive. The server update module automatically generates preview information requests for the server page profile module, thereby creating and updating pre-built preview information independent of client requests.

The preview information build process includes functions wherein the page profile module accesses preview information sources, extracts relevant preview information about a web site from the preview information sources, refines the information into a standard preview information format, and returns the preview information to the user and/or preview information archive. Preview information sources include web page networks such as the World Wide Web (WWW), the web site URL specified in the preview information request, and database archives.

Either the client or server page profile module builds preview information from a web site URL by accessing the URL and extracting web page content and feature information, including the web page thumbnail image, links and files, textual content, last time updated, financial and security features, and connection speed. The page profile module also builds preview information by accessing other web pages and databases with additional information about the specified URL, such as Open directory and adults databases. From these data sources, the page profile module can extract web page content and feature information including the web page rating and ranking, web site reviews, user notes, and web page advertisement information.

A second apparatus used to implement the system of the present invention is an embedded Dynamic Hyper Text Markup Language (DHTML) system. In the embedded DHTML system, preview information triggers are included in embedded applications that reside in the HTML code of a web page. These embedded applications appear as trigger icons located next to the URL link for the web site itself. Users select the desired trigger icon, and preview information is requested, generated, and displayed for the trigger icon's associated web site. Thus, the web sites are "preview ready," because the user does not have to download and install a client application to preview the web site; instead, the user merely selects a trigger icon, and the embedded application requests, generates, and displays preview information for the web site.

The embedded DHTML system operates in a similar fashion to the client-server system, except that embedded applications perform the client functions in the client-server system. Thus, when a user selects a trigger icon, an embedded application fields the user preview information request, generates preview information about web site content and features, compiles the preview information into a preview information package, and displays the preview information package to the user. The server system functions as a back-end to the embedded application by accepting requests for preview information, generating preview information about web site content and features, and returning preview information to the embedded HTML code application. Thus, the server system still offloads most of the burden of generating preview information, but that burden is now offloaded from the web site itself. In addition, just as the server system supports multiple client applications in the client-server implementation, it also supports multiple embedded applications in the embedded DHTML implementation.

In addition to providing web site preview information, the present invention may also be used to provide real-time or near real-time promotional information associated with a web site. The promotional information or announcement may be provided in conjunction with the preview information presented to the user. Specifically, when the user requests or is provided with preview information for a particular web site, the system "goes" to the web site and retrieves announcement information prepared by the web site sponsor. The announcement information may be in the form of an HTML file prepared by the web site's owner or marketing/promotional team. The HTML file is then presented to the user in conjunction with the presentation of the web site preview information.

DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

Figure 1:
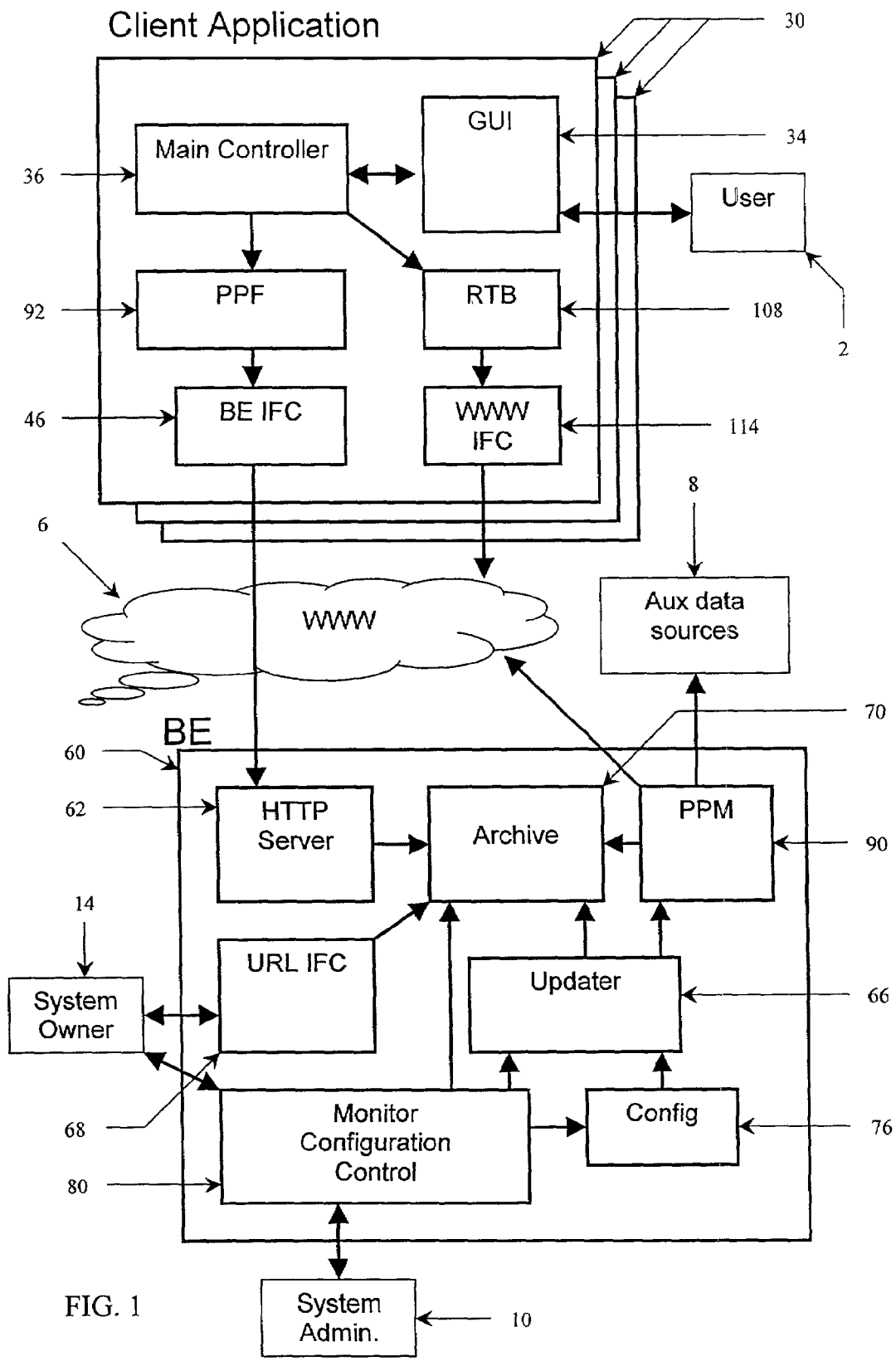
FIG. 1 is a block diagram of the client-server architecture of the present invention.

Referring now to FIG. 1, therein is shown the overall system architecture for a client-server implementation of the present invention. The client-server system includes client applications 30 that are connected to the server system/back-end 60 via a communication network, such as the Internet. External to the client-server system are users 2, the server system administrator 10, system owners 12, web page networks including the World Wide Web (WWW) 6, and auxiliary data sources 8. It should be understood that every server shown as a single unit may also be a collection of servers linked together, and that the different server functions may be implemented in a single server.

Users 2 input preview information requests to the client applications 30, which generate preview information for the requested URL and display the preview information to the user 2. The server/back-end 60 receives preview information requests from client applications 30, generates preview information, and returns preview information to the client applications 30. The system administrator 10 monitors the server/back-end 60 by performing tasks including observing server activities, configuring server parameters, controlling server actions, and entering server information. System owners 12, e.g., website operators, input preview information directly into the back-end, thereby providing preview information to the system. Both the user 2 and the server/back-end 60 generate preview information by performing builds on preview information sources that include web pages on networks including World Wide Web (WWW) 6, and auxiliary data sources 8, which include databases of web page information.

On the client side, the user 2 inputs a preview information request to the client 30 via the GUI 34. This request is sent to the main controller 36, which is the primary client control module. The main controller 36 sends the preview information request to the page profile fetch module 92, which sends a preview information request to the server/back-end 60, and receives preview information from the server/back-end 60, via the back-end interface 46. The main controller 36 also forwards preview information requests to the real-time build module 108, which builds preview information by accessing preview information sources including web page networks such as the World Wide Web (WWW) 6, and auxiliary data sources 8 such as web page information databases. The client 30 communicates with web page networks (WWW) 6 via the network (WWW) interface 114.

On the server/back-end side, the back-end 60 receives preview information requests from client applications 30, generates the requested preview information by building it in real-time or fetching it from a preview information archive 70, and returns the preview information to the clients 30. The Hyper Text Transfer Protocol (HTTP) Server 62 facilitates communication between client applications 30 and the back-end 60. The URL interface 68 and updater 66 contain lists of web site URLs and preview information generation rules, respectively, which the back-end 60 uses to build preview information that is stored in the preview information archive 70. The page profile module 90 builds preview information from preview information sources including web page networks (WWW) 6, and auxiliary data sources 8, which include web page information databases. Preview information generated by the page profile module 90 is stored in the preview information archive 70 and/or returned to client applications 30 via the HTTP Server 62. The system administrator 10 oversees back-end 60 activity via the monitor configuration control module 80, which allows the system administrator 10 to monitor system activities, configure system parameters, and control system activities.

Figure 2:
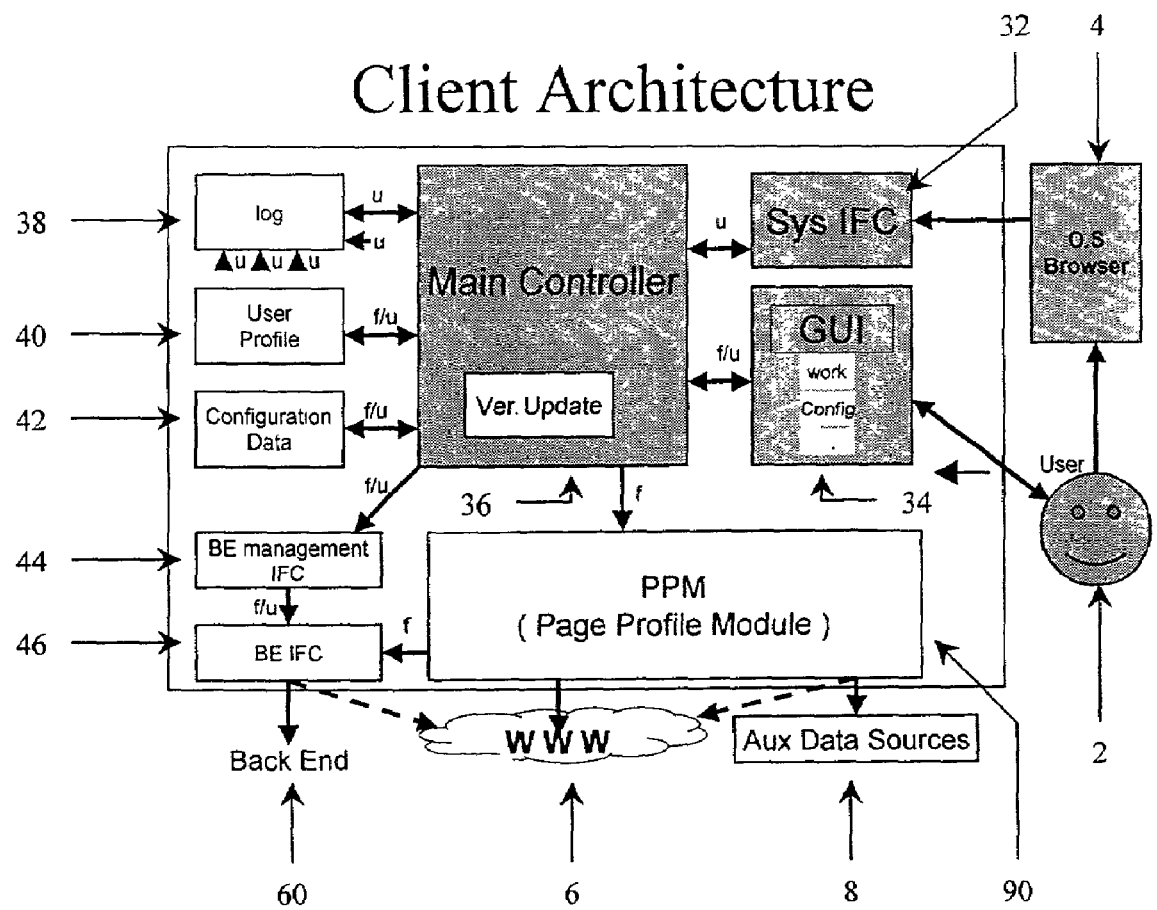
FIG. 2 is a block diagram of the client architecture according to the present invention.

The features of the client architecture of the present invention are shown in detail in FIG. 2. Referring now to FIG. 2, components external to the client 30 include the user 2, operating system browser 4, back-end 60, World Wide Web (WWW) 6, and auxiliary data sources 8. Client components include the system interface 32, graphical user interface (GUI) 34, main controller 36, page profile module 90, log module 38, user profile module 40, configuration data module 42, back-end management interface 44, and back-end interface 46.

As shown in FIG. 2, the user 2 is a person who requests preview information from the client 30, and who receives preview information generated by the client 30. The operating system browser 4 is a web browser such as NETSCAPE NAVIGATOR or MICROSOFT INTERNET EXPLORER combined with a plug-in that expands the browser's standard functions, thereby allowing it to interface with the client 30, pass commands to the client 30, and display preview information generated by the client 30. The back-end 60 is the server system, which supports the client 30 by generating preview information for the client 30. The World Wide Web (WWW) 6 is a network of web page information, and auxiliary data sources 8 are secondary preview information sources such as web page information databases that are used to generate preview information.

The client components include the system interface 32, which is the communication interface between the client main controller 36 and the operating system browser 4. The main controller 36 is the client's primary control unit that controls client activities, facilitates communication between the client modules, and commands the client. The user 2 inputs preview information requests via the GUI 34 and/or system interface 32, which display preview information returned to the user 2.

The page profile module 90 generates preview information by accepting preview information requests from the main controller 36, executing the preview information requests by generating the specified preview information, and returning the generated preview information to the main controller 36. The page profile module 90 can generate preview information in a number of ways, including building preview information from preview information sources, and fetching preview information from the back-end 60. Preview information sources generally include unformatted sources of preview information from which the page profile module 90 extracts preview information. The configuration data module 42 stores client configuration settings, including user preferences and other configurable variables that determine client behavior. These configuration settings determine which preview information the page profile module 90 fetches from the back-end 60, and which preview information the page profile module 90 builds from preview information sources.

The client page profile module 90 builds preview information from preview information sources by accessing preview information sources, extracting relevant preview information, and formatting the extracted information in a standard preview information format. Preview information sources include the web page networks (WWW) 6, and auxiliary data sources 8 such as web page information databases. The page profile module 90 fetches preview information from the back-end 60 by sending the preview information requests to the back-end 60 via the back-end interface 46, and the back-end 60 returns the requested preview information to the page profile module 90 through the back-end interface 46. The back-end interface 46 facilitates communication between the client 30 and the back-end 60.

The log module 38 records client operation information. The operation type that should be recorded is determined by the configuration data. The user profile module 40 processes the user specific portion of the log files to determine user specific information. The configuration data module 42 stores client configuration information that defines client properties, including data build preferences, user preferences, and module configuration information for the client modules. The back-end management interface 44 facilitates communication of non-page-profile module information between the back-end 60 and the client 30, such as programming and configuration updates.

Figure 3:
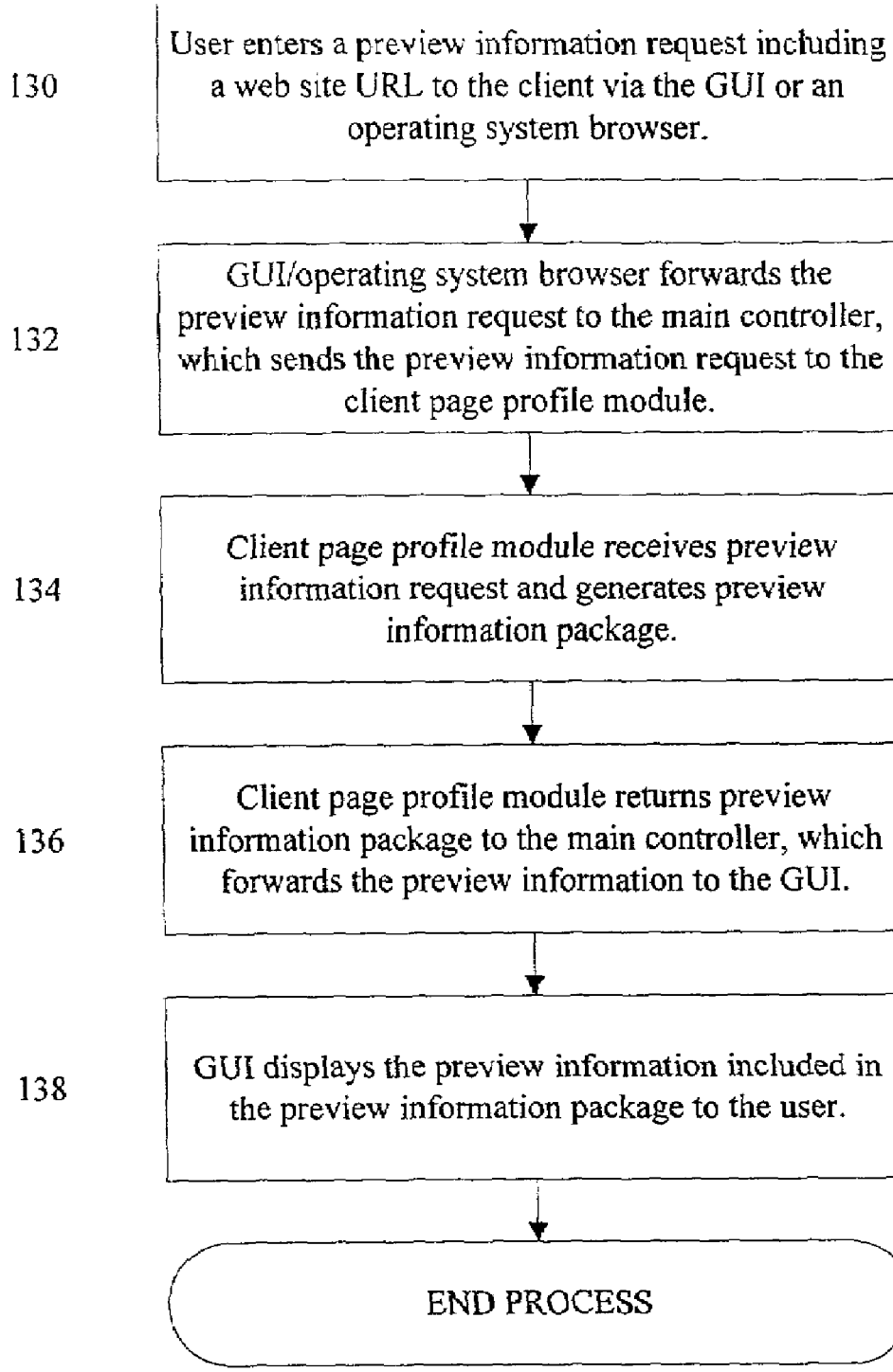
FIG. 3 is a flowchart of the Client Preview Information Generation Process.

FIG. 3 is a flowchart of the Client Preview Information Generation Process, the process wherein the user 2 requests preview information from a client 30, the client 30 generates preview information for the user 2, and the client 30 returns the preview information to the user 2. Referring to FIG. 3, the user initiates the Client Preview Information Generation Process by entering a preview information request for a web site URL via the GUI or operating system browser (step 130). The preview information request passes to the main controller, which forwards the request to the client page profile module (step 132). The client page profile module receives the preview information request and generates a preview information package, which includes the preview information requested by the user (step 134). After generating the preview information package, the client page profile module returns the package to the main controller, which forwards the preview information package to the GUI (step 136). Finally, the GUI displays the contents of the preview information package to the user, who examines the preview information and determines whether or not they are interested in accessing the web site (step 138).

The Client Preview Information Generation Process of FIG. 3 is carried out by the client architecture of FIG. 2. Referring now to FIG. 2, the user 2 inputs a preview information request for a web site URL via an operating system browser 4 or GUI 34. Preview information requests entered through an operating system browser 4 pass through the system interface 32 to the main controller 36, whereas preview information requests entered through the GUI 34 pass directly to the main controller 36. The user 2 can enter preview information requests by common methods including typing a web site URL into a web address blank, and selecting a web site URL link by means such as right-clicking the URL link.

After the user 2 has input a preview information request, the main controller 36 receives the request from the system interface 32 or GUI 34, and forwards the preview information request to the page profile module 90, which generates a preview information package for the URL specified in the preview information request. The page profile module 90 generates the preview information package by fetching preview information from the back-end 60 via the back-end interface 46, and/or by building preview information from preview information sources including networked web pages (WWW) 6 and auxiliary data sources 8.

After generating the preview information package, the page profile module 90 sends the preview information package to the main controller 36, which forwards the preview information package to the GUI 34. The GUI 34 displays the preview information within the preview information package to the user 2, who reviews the preview information, and uses the information to determine if they are interested in accessing the previewed web site.

Figure 4:
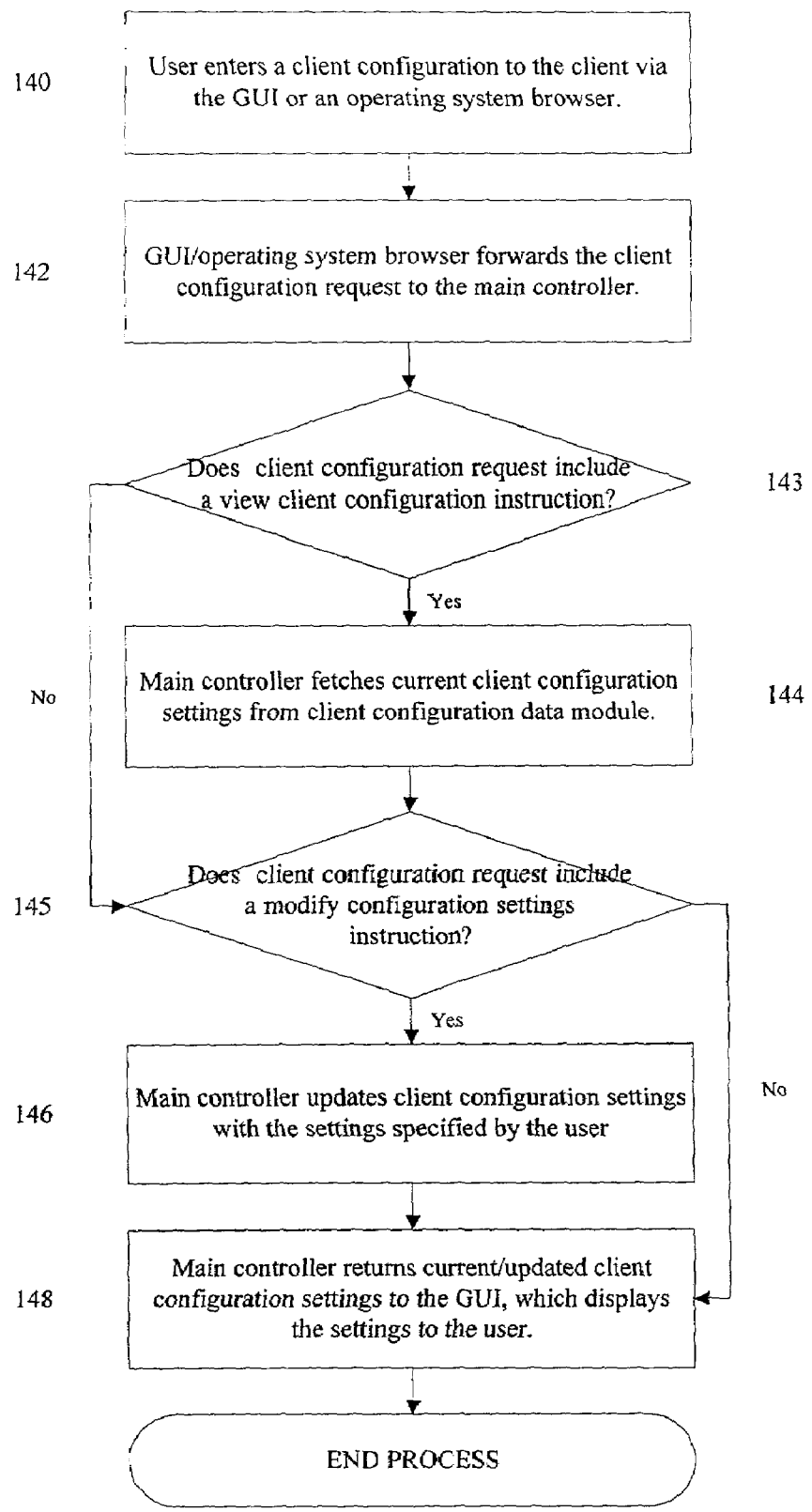
FIG. 4 is a flowchart of the Client Configuration Process.

In addition to generating preview information, the user 2 can also change client properties by modifying the client configuration settings. FIG. 4 is a flowchart showing the Client Configuration Process, in which the user views and modifies client configuration settings stored in the client configuration data module by entering client configuration requests. Client configuration requests include user instructions to view and modify client configuration settings.

Referring to the Client Configuration Process in FIG. 4, the user views and/or modifies client configuration settings by entering a client configuration request via the GUI or an operating system browser (step 140). The client configuration request passes to the main controller which processes the client configuration request (step 142). At step 143, it is determined whether the client configuration request includes a view client configuration settings instruction. If so, the main controller fetches the current client configuration settings from the client configuration data module (step 144). If not, the process proceeds directly to step 145. At step 145, it is determined if the client configuration request includes a modify configuration settings instruction. If so, the main controller updates the appropriate client configuration settings according to the client configuration request (step 146). If not, the process proceeds directly to step 148. At step 148, the main controller returns the current or updated client configuration information to the GUI, which displays the configuration data to the user.

The Client Configuration Process is carried out in the client architecture of FIG. 2 as follows. Referring now to FIG. 2, the user 2 changes the client configuration settings by initiating a client configuration request via the GUI 34 or operating system browser 4. Client configuration requests entered through the GUI 34 pass directly to the main controller 36, whereas client configuration requests entered through an operating system browser 4 pass through the system interface 32 to the main controller 36.

The main controller 36 processes the client configuration request and performs appropriate operations on the configuration data module 42. If the client configuration request includes an instruction to view the client configuration settings, the main controller 36 fetches the configuration settings from the configuration data module 42, and sends the configuration settings to the GUI 34, which displays the configuration settings to the user 2. If the client configuration request includes a modify configuration settings instruction, the main controller 36 updates the configuration data module 42 with the new configuration data settings.

Referring to FIG. 2, client 30 communication with the back-end 60 occurs via the back-end interface 46, and the client 30 typically initiates the communication. There are numerous types of client-back-end communication, including client 30 requests for management data from the back-end 60, and client 30 requests for programming updates from the back-end 60. Management data includes configuration data for the client that the user cannot affect, such as the server IP address and user statistics for the client application to record, and programming updates including modifications to the client application itself. The client-back-end communication types also include client 30 requests for permission to send data to the back-end, and client 30 requests whether or not to send data to the back-end 60. Client requests for permission to send data precede client requests whether or not to send data to the back-end.

Figure 5:
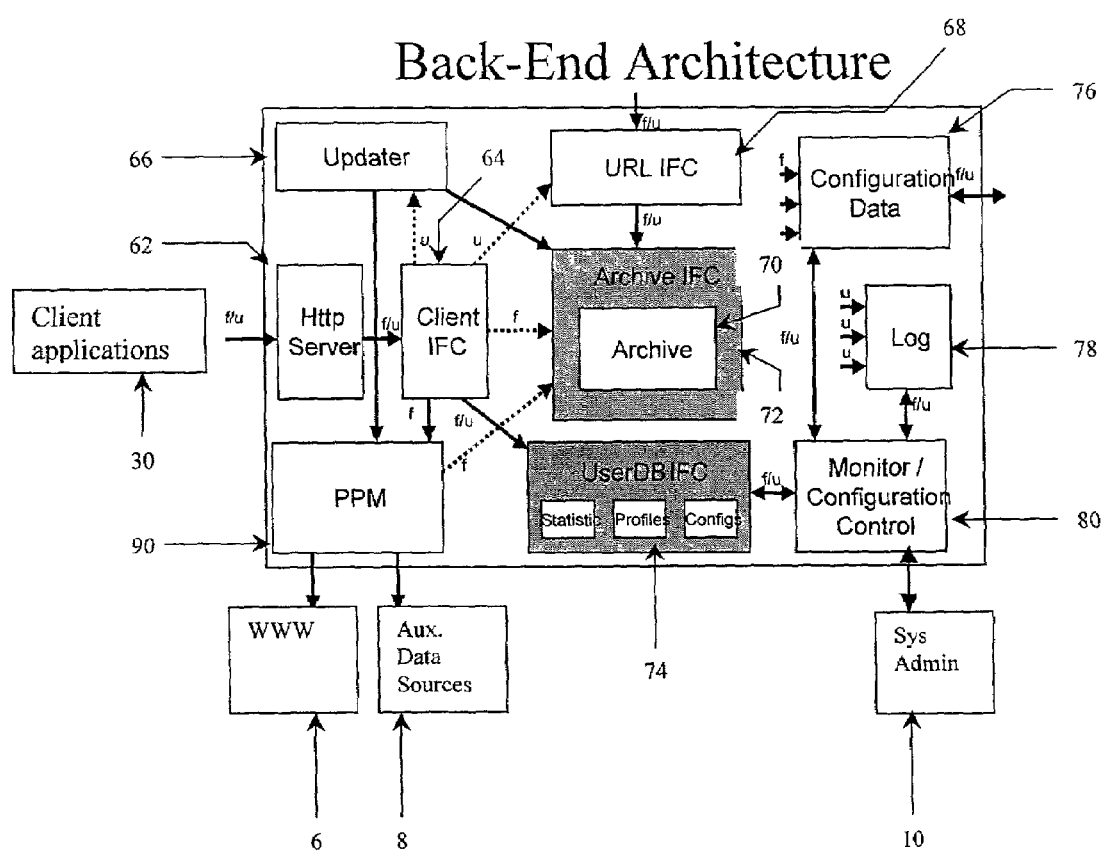
FIG. 5 is a block diagram of the server/back-end architecture according to the present invention.

Referring to FIG. 5, therein is shown the architecture of the server system/back-end 60. It should be understood that the terms server and back-end are interchangeable, and refer to the server system 60 that serves user client applications 30. The back-end 60 supports client applications 30 by generating preview information which is sent to the client applications 30.

As shown in FIG. 5, the back-end architecture includes back-end modules, as well as components external to the back-end 60. Components external to the back-end 60 include client applications 30, networked web pages (WWW) 6, auxiliary data sources 8, and the system administrator 10. Back-end components include the Hyper Text Transfer Protocol (HTTP) Server 62, client interface 64, updater 66, Uniform Resource Locator (URL) interface 68, preview information archive 70, archive interface 72, user database interface 74, configuration data module 76, log module 78, monitor/configuration control module 80, and page profile module 90.

Referring now to the back-end components, the HTTP server 62 is a standard server system that communicates with the client applications 2 via Hyper Text Transfer Protocol. The client interface 64 is a server software layer such as CGI or Java that receives client application requests and information and returns data to the client applications 30.

The server page profile module 90 generates preview information by accepting preview information requests from the client applications 30 and/or updater module 66, executing the preview information requests by generating the specified preview information, and returning the generated preview information to the client applications 30 and/or preview information archive 70. The page profile module 90 generates preview information in a number of ways, including building preview information from preview information sources, and fetching preview information from a preview information archive 70. Preview information sources typically include unformatted sources of preview information from which the page profile module 90 extracts preview information. Preview information archives 70 typically include databases of preview information that have already been built by the page profile module 90, and whose data is already in a standard preview information format.

The server page profile module 90 builds preview information from preview information sources by accessing preview information sources, extracting relevant preview information, and formatting the extracted information in a standard preview information format. Preview information sources include the web page networks (WWW) 6, and auxiliary data sources 8 such as web page information databases. The page profile module 90 fetches pre-built preview information from the preview information archive 70 and/or builds preview information in response to client application 30 and/or updater 66 requests for preview information. The page profile module configuration settings stored in the configuration data module 76 determine which preview information the page profile module 90 fetches from the preview information archive 70, and which preview information the page profile module 90 builds from preview information sources.

The preview information archive 70 is the preview information database generated by the server page profile module 90 in response to client 30 and updater 66 requests for preview information. The types of preview information stored in the archive 70 include web page thumbnail images, meta data extracted from web page html code, titles, keywords, and auxiliary data from sources external to a web page. Preview information archive 70 implementations include a simple file system, third party system, and combination system. A simple file system records preview information in preview files using file names followed by a type extension (e.g., .image, meta, .rt, aux). A third party system utilizes a third party database (e.g., ORACLE) to store whole data units of preview information. A combination system merges the simple file and third party systems. In a combination system, a web site URL is used to access a third party database with preview file pointers, which are then used to retrieve the requested data types from the appropriate preview files.

The archive interface 72 is a wrapper around a preview information archive 70 that connects the preview information archive 70 with other back-end modules. The archive interface 72 is a transparent interface, so that a change in the preview information archive 70 implementation only requires inserting a new archive interface 72, without modifying the other back-end module interfaces. Thus, if the preview information archive 70 implementation changes from a simple file system to a third party system, the archive interface 72 is changed from a simple file interface to a third party interface, thereby eliminating the need to modify the other back-end modules.

The updater 66 automatically updates the preview information archive 70 by generating preview information requests that are sent to the server page profile module 90, which stores the result preview information in the preview information archive 70. The rules and settings for when the updater 66 generates preview information requests are stored in the configuration data module 76. The URL interface 68 includes the list of web site URLs for which the updater 66 automatically generates preview information requests. Client applications 30 and/or the system administrator may add and/or delete entries from the web site URL list stored in the URL interface 68.

The user database interface 74 includes information about user statistics, user profiles, and user configurations, as well as an interface to retrieve and forward this information. The user database interface 74 receives this information from the client interface 64, stores the information, and sends the information to the monitor/configuration control module 80 when the information is requested by the system administrator 10. User statistics include general statistics on client application users, including manners of use and amount of use, whereas user profiles include user specific profile information, including the web sites visited and frequency of preview information use. User configurations include user client application configuration data, including user preferences, which are sent to client applications 30 that cannot store user configurations locally.

The configuration data module 76 contains configuration information, such as update roles for back-end modules. The log module 78 records back-end activity based on the log module configuration settings stored in the configuration data module 76. The monitor/configuration control module 80 oversees back-end activities, and allows the system administrator 10 to interface with the back-end. The system administrator 10 manages back-end activity by monitoring back-end operations, generating back-end administrative statistics, and modifying back-end configuration settings.

Figure 6:
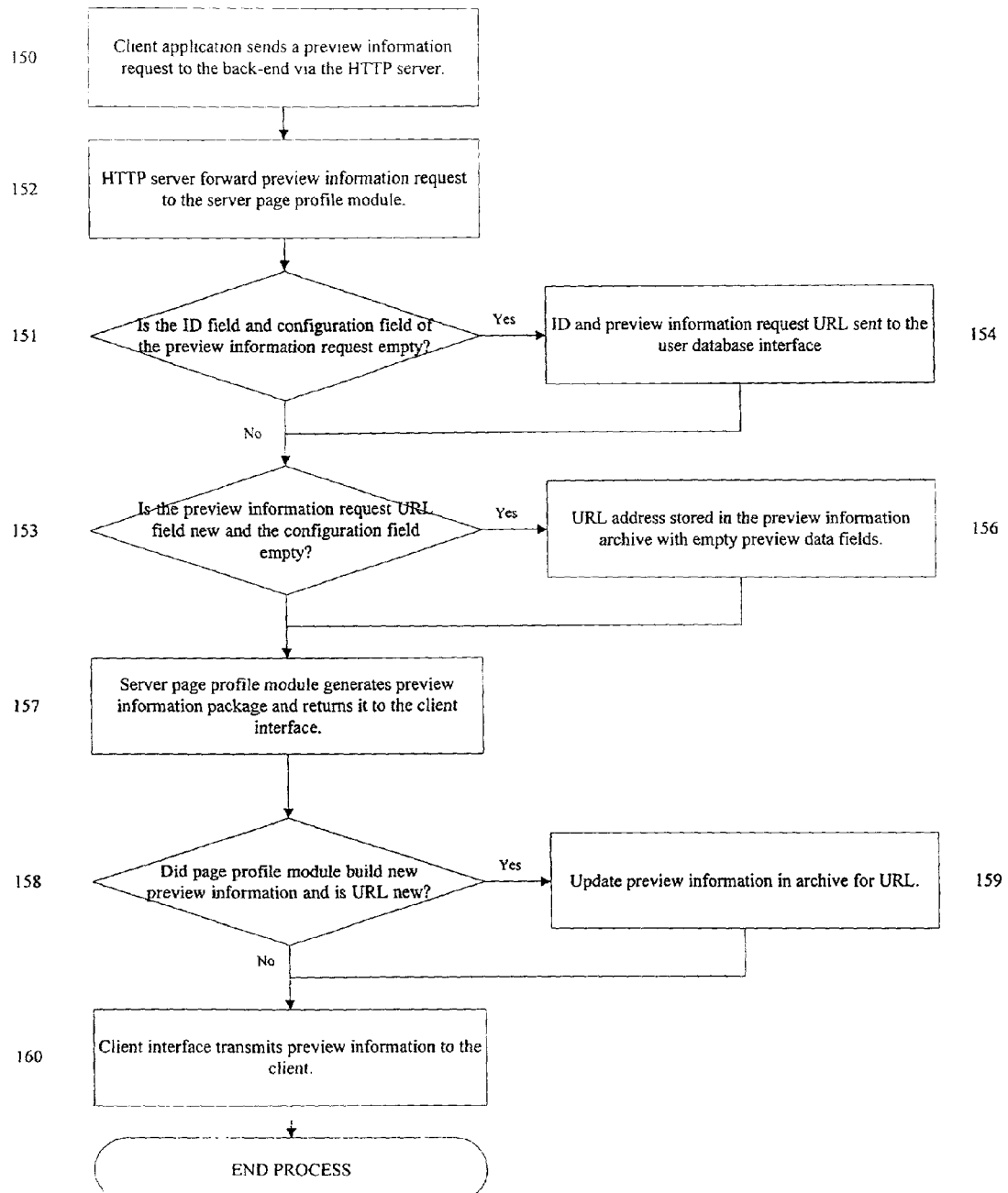
FIG. 6 is a flowchart of the Client Back-End Preview Information Generation Process.

FIG. 6 is a flowchart of the Client Back-End Preview Information Generation Process, the process wherein client applications 30 request preview information from the back-end 60, the back-end 60 generates preview information for client applications 30, and the back-end 60 returns the preview information to the client applications 30.

Referring to FIG. 6, the client application initiates the Client Preview Information Generation Process by sending a preview information request to the HTTP server (step 150). The HTTP server passes the preview information request to the client interface, which forwards the preview information request to the server page profile module (step 152). Included in the preview information request are user ID and URL fields. The user ID field is the unique client identifier, and the URL field is the web address of the web site for the back-end to generate preview information.

At step 151, it is determined whether the back-end configuration is set to save the user ID and URL fields sent from the client. If so, the ID and URL are sent to the user database interface, which records the user ID and URL in the preview information archive, thereby tracking the URLs that are accessed by individual users (step 154). If at step 151 it is determined that the back-end configuration is not set to save the user ID and URL, then the process proceeds to step 153.

At step 153, it is determined whether the back-end configuration is set to supplement the URL list stored in the URL interface. If so, the URL field is sent to the URL interface, which records the URL in the URL interface list, thereby allowing the back-end to automatically update the URL (step 156). If at step 153 it is determined that the URL field is not new or the back-end configuration field is not set to supplement the URL list, the process proceeds to step 157.

The server page profile module generates a preview information package with the requested preview information, and returns the preview information package to the client interface (step 157). At step 158, it is determined if the page profile module built new or more recent preview information for the URL stored in the preview information archive. If so, the new/updated preview information is stored in the archive, updating the archive's preview information entries (step 159). If the server page profile module did not build new/updated preview information and/or the URL is not new, the process proceeds to step 160. At step 160, the client interface sends the preview information package to the client application.

Figure 7:
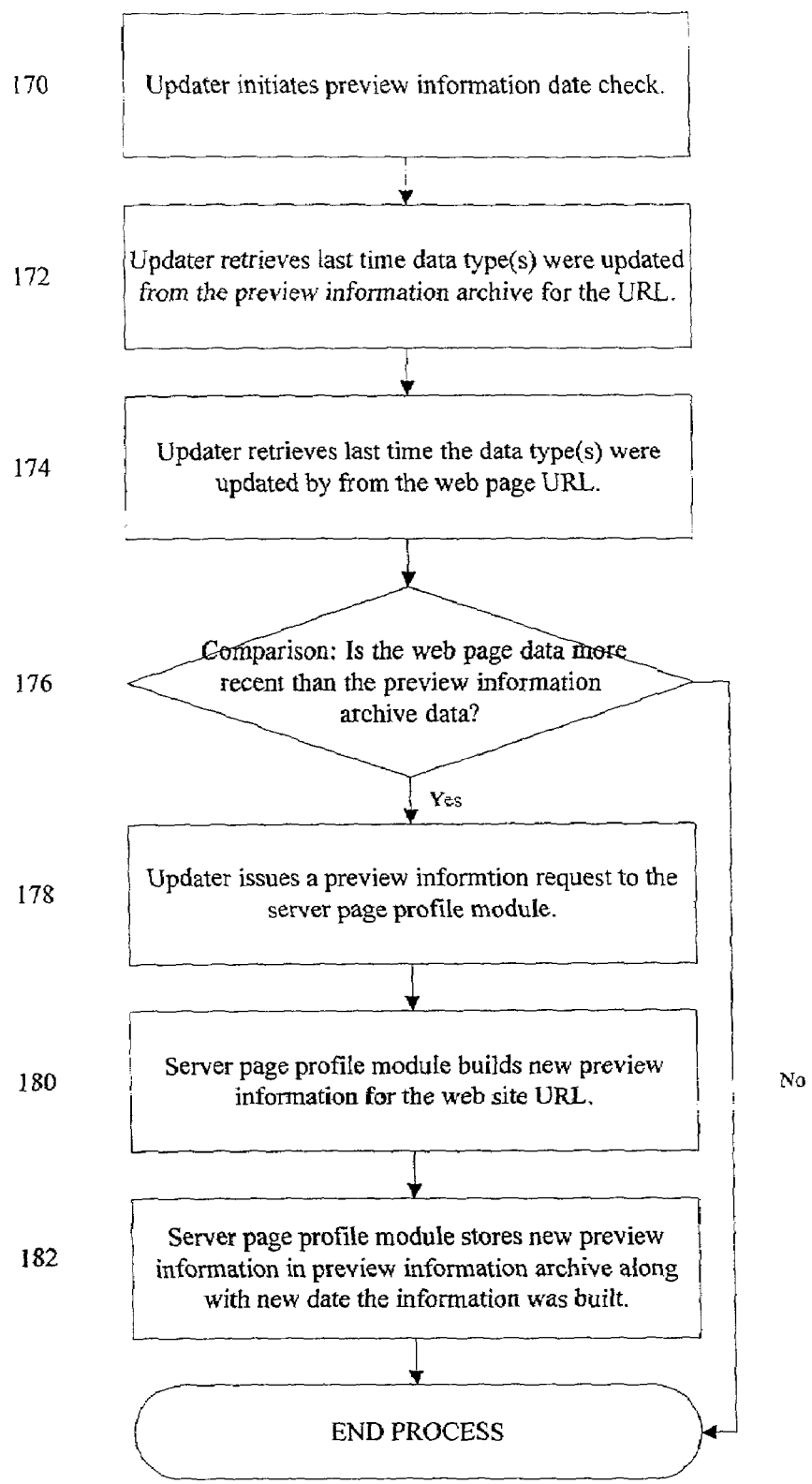
FIG. 7 is a flowchart of the Update Back-End Preview Information Generation Process.

FIG. 7 is a flowchart of the Updater Back-End Preview Information Generation Process, the process wherein the updater generates a preview information request, the server page profile module generates the requested preview information, and the preview information is stored in the preview information archive.

Referring to FIG. 7, the Updater Back-End Preview Information Generation Process begins when the updater initiates a preview information date check in response to updater rules and configuration settings, as well as external prompts from sources such as a system administrator (step 170). The preview information date check includes the web site URL to be updated, and the data type(s) to be updated, such as the web site's thumbnail image, meta data, real-time data, and auxiliary data. The updater retrieves the last time the data type(s) were updated from the preview information archive (step 172), retrieves the last time the data type(s) were updated from the specified URL by accessing the URL (step 174), and compares these update times to determine if web page data content is more recent than the preview information archive data content (step 176).

If the preview information archive data content is as recent as the web page content, the process simply ends (step 176). Conversely, if the web page content is more recent than the preview information archive data, the process proceeds and the updater issues a preview information request to the page profile module, which includes instructions to build preview information from the preview information sources (step 178). The preview information request specifies the data type(s) that are no longer current and need to be updated by the server page profile module. The server page profile module executes the preview information request, accesses the preview information sources, and extracts preview information for the specified data types (step 180). The page profile module stores the preview information in the preview information archive along with the new date the information was obtained, thereby updating the archive contents (step 182).

Figure 8:
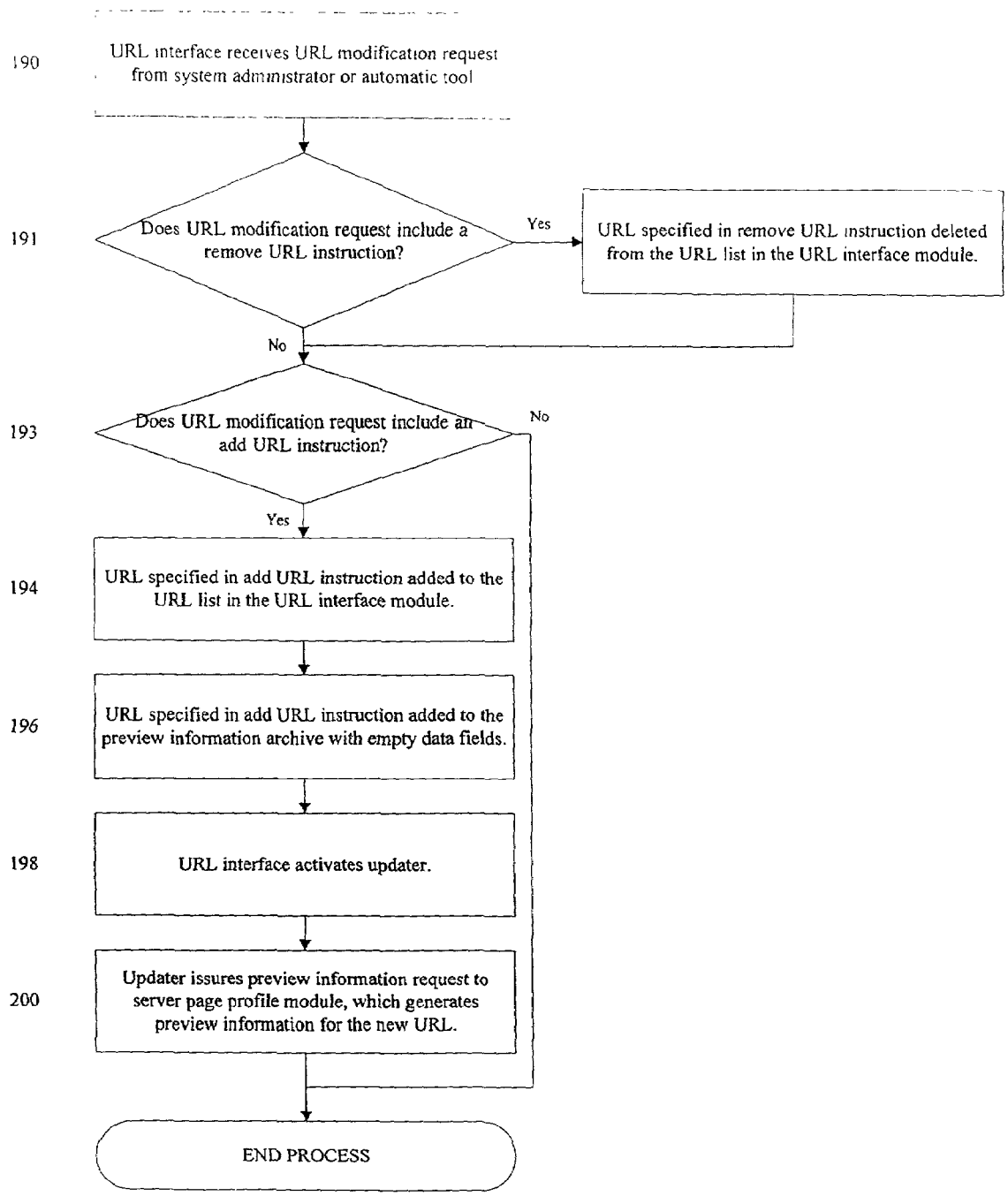
FIG. 8 is a flowchart of the Change URL List Process.

The Change URL Process to modify the list of web site URLs stored in the back-end URL interface is shown in FIG. 8. The updater automatically updates web site preview information stored in a preview information archive for those web site URLs stored in the URL interface module.

Referring to FIG. 8, the URL interface receives a URL modification request initiated by sources including the system administrator, an automatic tool, or web page owners (step 190). It is then determined if the URL modification request includes a remove URL instruction (step 191). If so, the URL interface deletes the specified URL from the URL interface list, and deletes the URL entry and its associated preview information in the preview information archive (step 192) and proceeds to step 193. At step 191, if it is determined that the URL modification request does not include a remove URL instruction, the process proceeds directly to step 193.

At step 193, it is determined if the URL modification request includes an add URL instruction. If not, the process simply ends. If so, the process proceeds to step 194.

At step 194, the URL interface adds the specified URL to the URL interface list. In response to an add URL instruction, the URL interface also passes the URL to the preview information archive, which creates a new URL entry with empty preview information data (step 196). At step 197, it is determined if the back-end configuration is set to generate preview information for the new URL entry. If so, then the process proceeds to step 198, and the URL interface activates the updater (step 198), which issues a preview information request to the server page profile module in order to update the new entry in the preview information archive (step 200). If not, the process ends.

Figure 9:
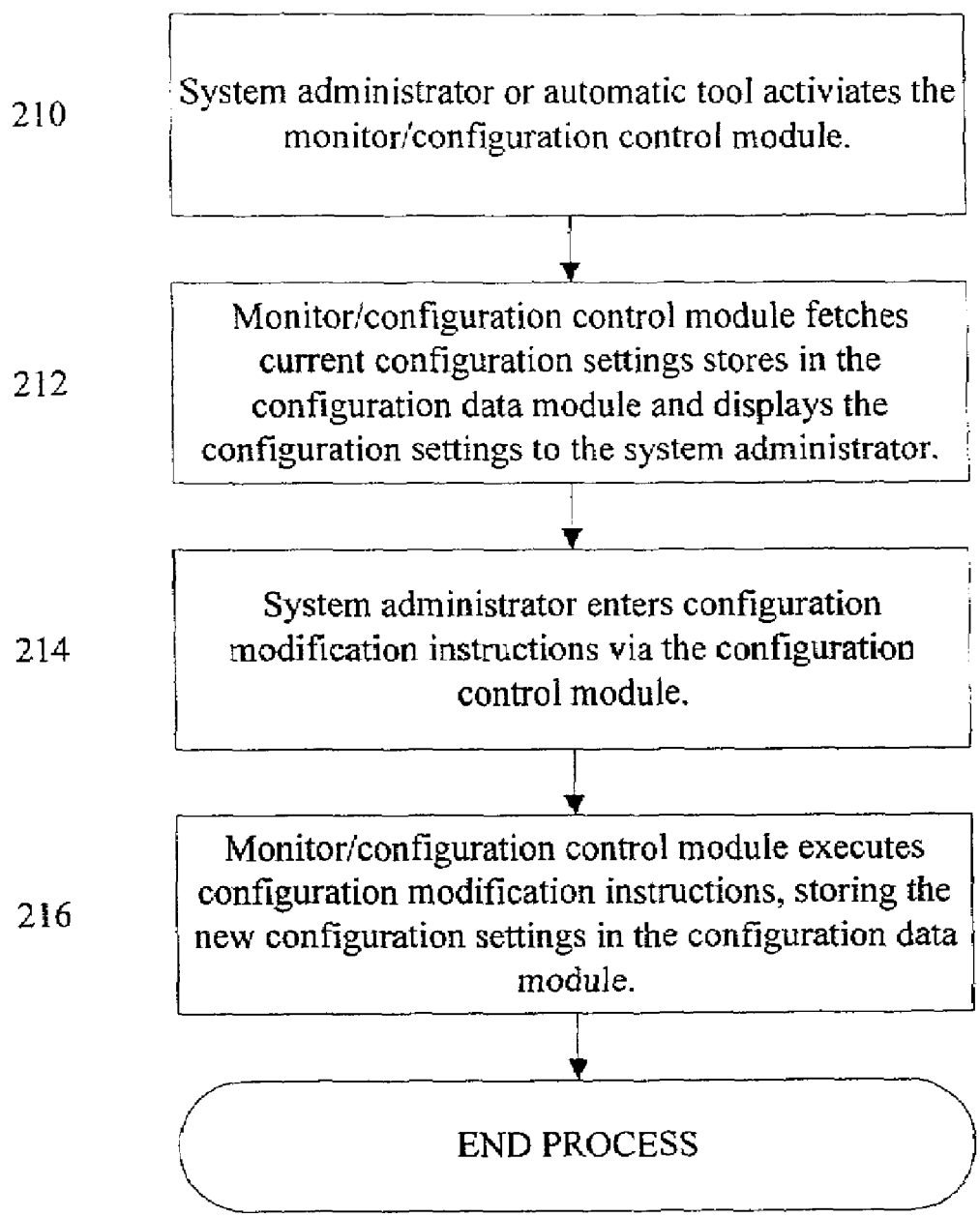
FIG. 9 is a flowchart of the Change Configuration Process.

FIG. 9 shows the Back-End Configuration Process, which is used to view and update back-end configuration settings stored in the server configuration data module. Referring to FIG. 9, the back-end configuration process begins by activation of the monitor configuration control module, which can be activated by the system administrator via the HTTP server, Java RMI, and other applications (step 210). The monitor configuration control module fetches the current configuration data from the configuration data module and displays the configuration data to the system administrator (step 212). The system administrator then modifies the configuration data settings by issuing configuration modification instructions to the monitor/configuration control module (step 214), which executes the configuration modification instructions and stores the new configuration settings in the configuration data module (step 216).

Also included in the back-end is a system alarm function. Referring to the back-end architecture shown in FIG. 5, the monitor configuration control module 80 monitors the back-end 60 for system problems including malfunctions, loading problems, and connection problems. Whenever the monitor configuration control module 80 detects these or other error conditions, the module sends an alarm to personnel via methods that include pop-up windows, email, beeper, or phone messages.

Figure 10:
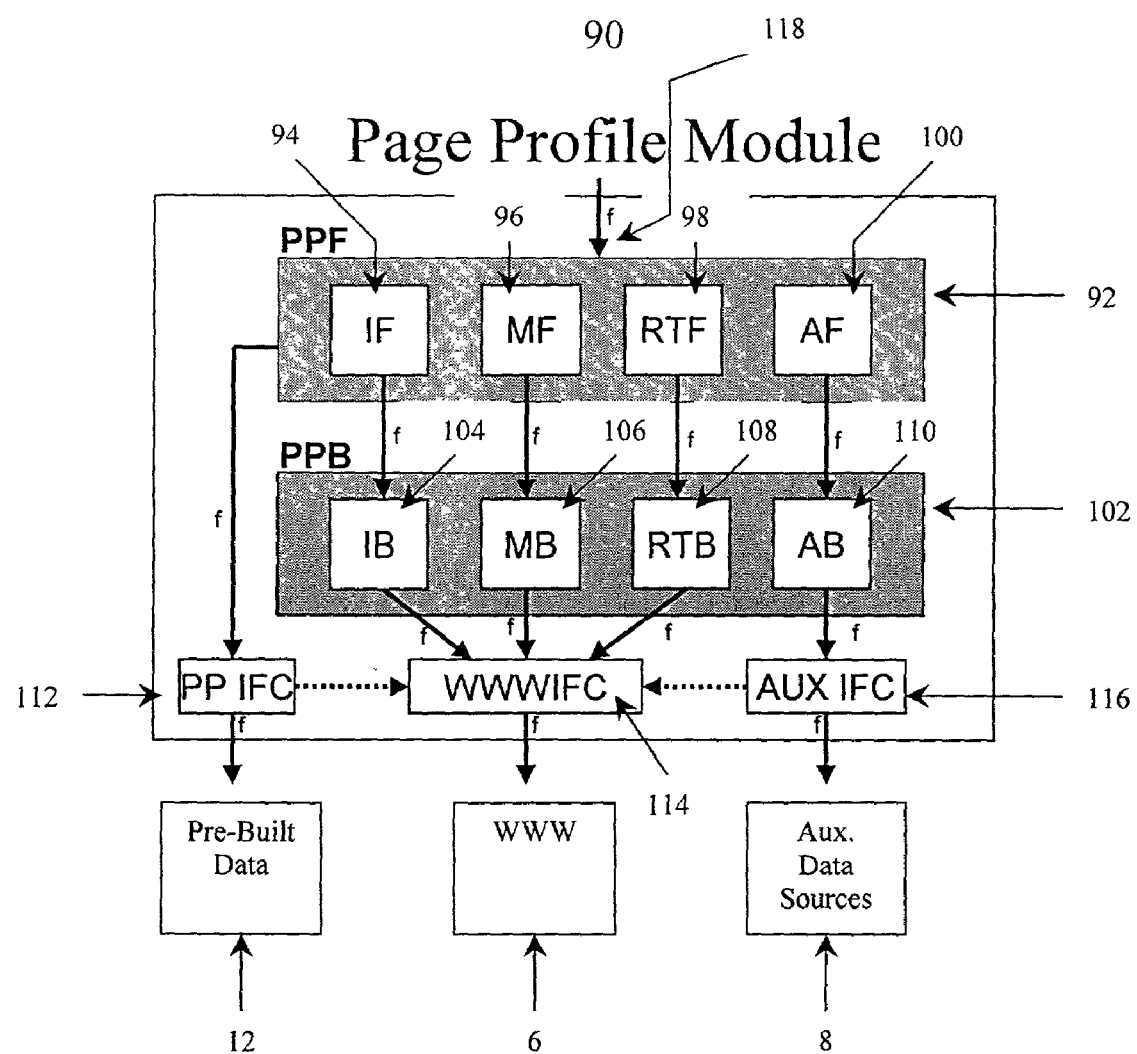
FIG. 10 is a block diagram of the page profile module architecture according to the present invention.

Both the client programs 30 and the server system 60 contain a page profile module 90, which receives preview information requests that include web site URLs, generate preview information packages for the web site URLs, and return preview information packages with the requested preview information. FIG. 10 shows the page profile module architecture, which includes a page profile fetch module 92, a page profile build module 102, a page profile interface module 112, a WWW interface module 114, and an auxiliary interface module 116. External to the page profile module 90 is pre-built preview data 12 in the preview information format. Also external to the page profile module 90 are preview information sources, which are raw data sources from which the page profile module extracts preview information. Preview information sources include web page networks 6 such as the World Wide Web (WWW), and auxiliary data sources 8, such as web site information databases.

The page profile fetch module 92 receives fetch requests from modules external to the page profile module, and generates preview information fetch requests for the page profile submodules, as well as other modules external to the page profile module 90. Fetch requests to external modules include preview information fetch requests by the client page profile module 90 to the back-end 60, and preview information fetch requests by the server page profile module 90 to preview information archives 72. The page profile build module 102 extracts preview information from preview information sources including the WWW 6 and auxiliary data sources 8. The page profile interface module 112 facilitates communication between the page profile module 90 and other modules.

The page profile fetch module 92 receives the preview information request sent to the page profile module 90, and determines whether to build the requested preview information, and/or to retrieve the requested preview information from an archive of pre-built preview information 12. The page profile module configuration settings determine which preview information is built, and which preview information is retrieved from a preview information archive of pre-built data 12. The pre-built data 12 may come from sources including the back-end 60, server preview information archives 90, and preview information databases supplied by web site owners. After determining which preview information to build, and which preview information to retrieve from pre-built data sources 12, the page profile fetch module 92 issues the appropriate preview information fetch requests to the page profile build module 102, and page profile interface 112, respectively. If the pre-built preview information 12 is on the web page network 6, then the page profile interface module 112 accesses the pre-built data 12 on the web page network 6 via the WWW interface 114.

The page profile fetch module 92 includes four sub modules: the image fetch module 94, meta fetch module 96, real-time fetch module 98, and auxiliary data fetch module 100. The image fetch module 94 generates fetch instructions to retrieve web site thumbnail images, whereas the meta fetch module 96 generates fetch instructions to retrieve web site meta data by analyzing html source code, including links in the page, files and media in the page, the owner imbedded <meta> information, textual lines in the page, and information forms. The real-time fetch module 98 generates fetch instructions to retrieve real-time web site data including the web site connection speed, and the auxiliary data fetch module 100 generates fetch instructions to retrieve web site data from auxiliary data sources 8.

The page profile build module 102 builds page profile data for a given URL by accessing preview information sources including the specified URL, extracting preview information from the preview information sources, formatting the information in a preview information format, and returning the preview information to the source that requested the preview information. The page profile build module 102 includes four sub modules: the image build module 104, the meta build module 106, the real-time build module 108, and the auxiliary build module 110. These sub modules have access to outside information via the WWW interface module 114, which connects the page profile module 90 to web page networks 6, and the auxiliary interface 116, which connects the page profile module to auxiliary data sources 8.

The page profile build module 102 and its sub modules access preview information sources of raw web page information, extract the requested information from the sources, and format the requested information into a standard preview information format. The preview information built by the page profile build module 102 is supplemented by any pre-built data fetched by the page profile fetch module 92, thereby creating a preview information package that includes the requested preview information. The preview information package is returned to appropriate destinations that include the user 2, client applications 30, and preview information archives 70.

The image build module 104 creates a web site thumbnail image by rendering a thumbnail image from page site HTML code. The image build module 104 receives a fetch request that includes a web page URL on the World Wide Web 6, which the image build module 104 accesses via the WWW interface 114. The image build module 104 accesses the web page URL and renders the web site HTML code into a thumbnail image of the page, which is formatted in a standard preview information format. The render program can be pre-existing (e.g., INTERNET EXPLORER, NETSCAPE NAVIGATOR) and integrated into the image build module 104, or specifically created for the image build module 104 and controlled by the image build module 104. The formatted preview information of the web site thumbnail image is then displayed to the user 2 and/or stored in a preview information archive 70.

The meta build module 106 extracts information from web page HTML source code by parsing HTML files and extracting relevant information. The meta build module 106 receives a fetch request that includes a web site URL on the World Wide Web 6, which the meta build module accesses via the WWW interface 16. The meta build module 106 accesses the web page HTML code, parses the code, and extracts information including links in the page, files and media in the page, the owner imbedded <meta> tag information, textual lines in the page, and information forms such as credit card forms. This information is formatted in a standard preview information format, and is then displayed to the user 2 and/or stored in a preview information archive 70.

The real-time build module 108 determines real-time data about the web site such as its connection speed. The real-time build module 108 receives a fetch request that includes a web site URL on the World Wide Web 6, which the real-time build module accesses via the WWW interface 114. After accessing the web site, the real-time build module 108 measures the ping time and data transfer rate between the build module and the web site. This measurement information is formatted in a standard preview information format, and is then displayed to the user 2 and/or stored in a preview information archive 70. Display of this information may be in textual or graphical form in either absolute (e.g., ping=0.2 μsec; data rate=5 K/sec) or relative measurements (e.g.,: 10% DSL bandwidth; 80% 55 K modem bandwidth).

The auxiliary build module 110 gathers information from auxiliary data sources 8 that are independent from pre-built data 12 created by the client-server system, and independent from the raw data source provided by the web site being profiled. The auxiliary build module 110 receives a fetch request that includes a web site URL on the World Wide Web 6, which the auxiliary build module 110 uses to gather information from auxiliary data sources 8 via the auxiliary interface 116. Auxiliary data sources 8 include databases of information about the specified URL, as well as other server systems (e.g., ICQ) that can be prompted to generate and return information about a URL. If the auxiliary data source 8 is connected to the web page network 6, then the auxiliary interface 116 accesses the auxiliary data source 8 via the WWW interface 114.

The auxiliary build module 110 accesses auxiliary data sources 8, extracts the specified preview information and formats the information in a standard preview information format. The type of information returned is determined by factors including the page profile module configuration settings and the web site being profiled. Information extracted from auxiliary data sources 8 include financial information, web page ratings, web page subject matter, adult page identification information, and commercial banners for advertising. The formatted preview information is displayed to the user 2 and/or stored in a preview information archive 70.

The data flow of the page profile module 10 is also illustrated in FIG. 10. Referring to FIG. 10, an external module sends a preview information request 118 that includes a web site URL to the page profile module 90. The page profile fetch module 92 receives the preview information request 118 and, based on its configuration settings, determines which preview information to build, and which preview information to retrieve from pre-built preview information archives 12. For preview information retrieved from pre-built data archives 12, the page profile fetch module 92 sends a fetch request including the specified URL through the page profile interface 112 to pre-built data archives 12, which return pre-built preview information.

For data built in real-time, the image fetch module 94, meta fetch module 96, real-time fetch module 98, and auxiliary fetch modules 100 generate preview information fetch requests, which are sent to the image build 104, meta build 106, real-time build 108, and auxiliary build 110 sub modules, respectively. The page profile build module 102 receives these fetch requests through the image build 104, meta build 106, real-time build 108, and auxiliary build 110 sub modules, which access preview information sources to build page profile data.

The image build 104, meta build 106, real-time build 108 modules generate page profile data by connecting to a web page network 6 via the WWW interface 114, and accessing the appropriate web site for the URL specified in the preview information fetch requests. These modules extract the requested preview information, format the preview information, and return the preview information to the page profile module 90. The auxiliary build module 110 generates preview information by connecting to auxiliary data sources 8 via the auxiliary interface 116, accessing auxiliary data source entries using the specified URL, extracting the requested preview information, formatting the preview information, and returning the preview information to the page profile module 90.

The client-server system includes a number of performance tests that allow the system administrator to perform functions including monitoring system performance and detecting system errors. These tests are divided into test sets which include client independent tests, back-end archive tests, back-end page profile module tests, database tests, miscellaneous back-end tests, loading tests, and preview independent tests for third party component like the HTTP server.

Client independent tests determine client operation independent of the back-end. The client independent tests include independent build tests, which measure the amount of time for the page profile module to build each independent data unit (image, meta, real-time, and auxiliary), as well as dependent build tests, which measure the amount of time for the page profile module to build combinations of the independent data units simultaneously. The client independent tests also include a trigger time test, which measures the amount of time from a user trigger to page profile module start, and a display time test, which measures the amount of time from a user trigger to data display to the user. The client independent tests further include GUI performance tests and log file tests, which measure GUI performance and log file capacity, respectively. The client independent tests also include adverse situation tests, which measure client operation under extreme circumstances including no server connection, no back-end response, and low memory.

Back-end archive tests measure back-end archive response to client requests for page profile data. The back-end archive tests include independent extraction tests, which measure the amount of time for the archive to retrieve each of the independent data units (image, meta, real-time, and auxiliary), as well as combination extraction tests, which measure the amount of time for the archive to retrieve combinations of the independent data units simultaneously. The back-end archive tests also include client response tests, which measure the time from archive receipt of a client page profile data request to archive response with the requested page profile data.

Back-end page profile module tests measure the back-end page profile module performance. The back-end page profile module tests include independent build tests, which measure the time for the back-end page profile module to build each of the independent data units (image, meta, real-time, auxiliary), as well as independent load tests, which measure the time for the back-end page profile module to build each of the independent data units (image, meta, real-time, auxiliary) under different load conditions. The back-end page profile module tests also include bandwidth measurement tests that determine the required bandwidth for maximum back-end page profile module performance and throughput. For each independent data type (image, meta, real-time, auxiliary), the back-end page profile module tests determine the amount of updates that can be performed in a predefined time based on the bandwidth and computing resources, as well as the back-end availability to use the back-end page profile module to create real-time data for a client.

The database tests measure the user database and archive database performance. The database tests include data extraction tests, which measure statistics including the average and maximum data extraction times, from both the user and archive database memories and the user and archive database caches. These statistics are used to determine the optimal database and cache parameters such as memory size and access time. The database tests also measure the user and archive database update times, which are the times for the user and archive databases to save information to memory, respectively, as well as statistics generation tests, which measure user and archive database features including capacity and data fragmentation.

Miscellaneous back-end tests measure a variety of back-end features. The miscellaneous back-end tests include log file tests, which measure log file size and performance, as well as update tests, which measure the time and efficiency of the archive update process. The miscellaneous back-end tests also include alarm tests, which measure the back-end alarm features and settings, as well as HTTP server tests, which measure the performance of the HTTP server. The miscellaneous back-end tests further include monitoring and configuration tests, which measure back-end monitoring functions and back-end configuration processes including dynamic configuration of the back-end, which tests reconfiguration of the back-end while the server system is running.

Loading tests measure back-end loading features and back-end response under different loading conditions. The loading tests include tests which vary the client application and profile data generation loading on the back-end, and then monitor and measure the back-end response. The results of the loading tests are used to determine the critical system load, which is the maximum load the back-end can handle.

Preview independent tests measure client server communications features that are independent of the system's preview data extraction features. Preview independent tests include HTTP server performance and load capacity tests, because the system performance is dependent on the back-end connection speed. Preview independent tests also include HTTP service tests, which measure the number of requests the HTTP server can handle and its response time, as well as file archive tests, which measure the number of files the archive can hold and serve and its response time. The preview independent tests also include initial run time tests, which measure the time it takes Java applets, Java scripts, and browser plug-ins to run for the first time after booting and connecting, as well as subsequent run time tests, which measure the time it takes Java applets, Java scripts, and browser plug-ins to run subsequently.

The present invention includes a number of features and applications. One feature of the present invention is the ability to determine the content of a web site prior to viewing the web site. A user client can enter a web site address to preview and view the web site's preview information, thereby determining the web site's content without spending the time and effort to view the web site.

An additional feature that will be apparent to those skilled in the art is the ability to determine the most relevant and desirable web site from a list of web sites. A user is not limited to previewing a single web site, but may submit multiple web sites at one time in order to compare the web site preview information. Thus, the user can determine which web site from a list of web sites includes the particular content and features that the user wants, and can access that web site without spending time and effort viewing additional web sites. This feature may be integrated with web search engines which typically provide lists of web sites. Using the present invention, the results of the web search include preview information along with the list of web sites.

A further feature that will be apparent to those skilled in the art is the ability to automatically sort a list of web sites by their preview information, thereby enhancing the preview feature advantages. A user can enter a list of criteria such as connection speed, last time updated, meta tag information, and web page text content to selectively group and rank different web sites. The user then selects the web site with the most desirable content and features, thereby saving time and effort while receiving the most relevant information available.

Another feature that will be apparent to those skilled in the art is the user's ability to select relevant web sites without entering a web site address by searching the preview data archive directly. Instead of entering a web address into the GUI to generate preview information for an already known web site, the GUI can include an archive search feature which allows the user to search the preview archive for web sites with ceratin preview information content and features. The archive returns preview information packages that satisfy the user's search criteria to the user, who now has a list of relevant web sites and their preview information. Thus, the user avoids using a traditional search engine to generate a list of relevant and irrelevant web sites that must then be previewed and prioritized. Instead, the user searches the preview archive directly, thereby saving time while retrieving a more accurate list of relevant web sites.

In addition to providing web site preview information, the present invention may also be used to provide real-time or near real-time promotional information associated with a web site. The promotional information or announcement may be provided in conjunction with the preview information presented to the user. Specifically, when the user requests or is provided with preview information for a particular web site, the system "goes" to the web site and retrieves announcement information prepared by the web site sponsor. The announcement information may be in the form of an HTML file prepared by the web site's owner or marketing/promotional team. The HTML file is then presented to the user in conjunction with the presentation of the web site preview information.

The announcement information allows web site owners or operators to interact with occasional users at a crucial decision point. From the web site owner's point of view, the user previewing web site information is at a critical decision point because at this point in the process, the web site has been brought to the user's attention along with many other web sites, and the user is about to decide on their next step. The information that the web site owner chooses to convey to the user is very important in attracting the user's attention and bringing the user to the web site. In essence, the user (possibly a prospective customer) is literally at the doorstep of the web site owner, and thus this final marketing effort may be much more focused and effective.

The announcement information provided to the user in accordance with the present invention is substantially different from conventional banner advertisements used with web sites. First, banner advertisements force the web site owner or marketer to embed them into a predefined space in other web pages. Second, the user needs to actually click on the banner in order to view the marketing offer itself.

In contrast, the announcement information provided in accordance with the present invention is not embedded in the code of other web sites, but rather, simply resides on the server providing the web site. As a result, it is much easier to change or update. Additionally, the announcement information according to the present invention allows the user to view the promotion information on the screen without the need to "go" to the promoter's site again.

The present invention also simplifies the work that needs to be performed by the web site owner or operator. The web site owner or operator need only create the announcement and store it in a pre-defined location on the web site server. The owner can then create, publish, replace or remove the announcement at any time, effectively controlling the announcement's life span. For example, a web site owner may create an announcement for a limited period of time, such as a special offer for a limited number of hours, and then simply withdraw the special offer by withdrawing the announcement information for that offer.

The announcement information is included with the preview information in the following manner. When the user selects a particular web site to preview, the system first checks its internal database to determine whether or not the web site has the announcement mechanism activated. If so, the system requests the announcement information from the web site by creating a request, which includes context parameters, such as user-id and search parameters.

The request is sent to the web site, where it is processed by a designated script. The web site's script may either return a predefined announcement page, or it may build a customized announcement page based on the supplied parameters. For example, if a user searches on the term "lens", and then previews a camera manufacturer's web site, the announcement request to the camera manufacturer's web site will include the term "lens". In turn, the announcement script associated with the camera manufacturer may generate a special announcement regarding "lenses". The announcement information is then presented to the user along with the remaining web site preview information. The announcement information may be any combination of audio or visual information.

Figure 11:
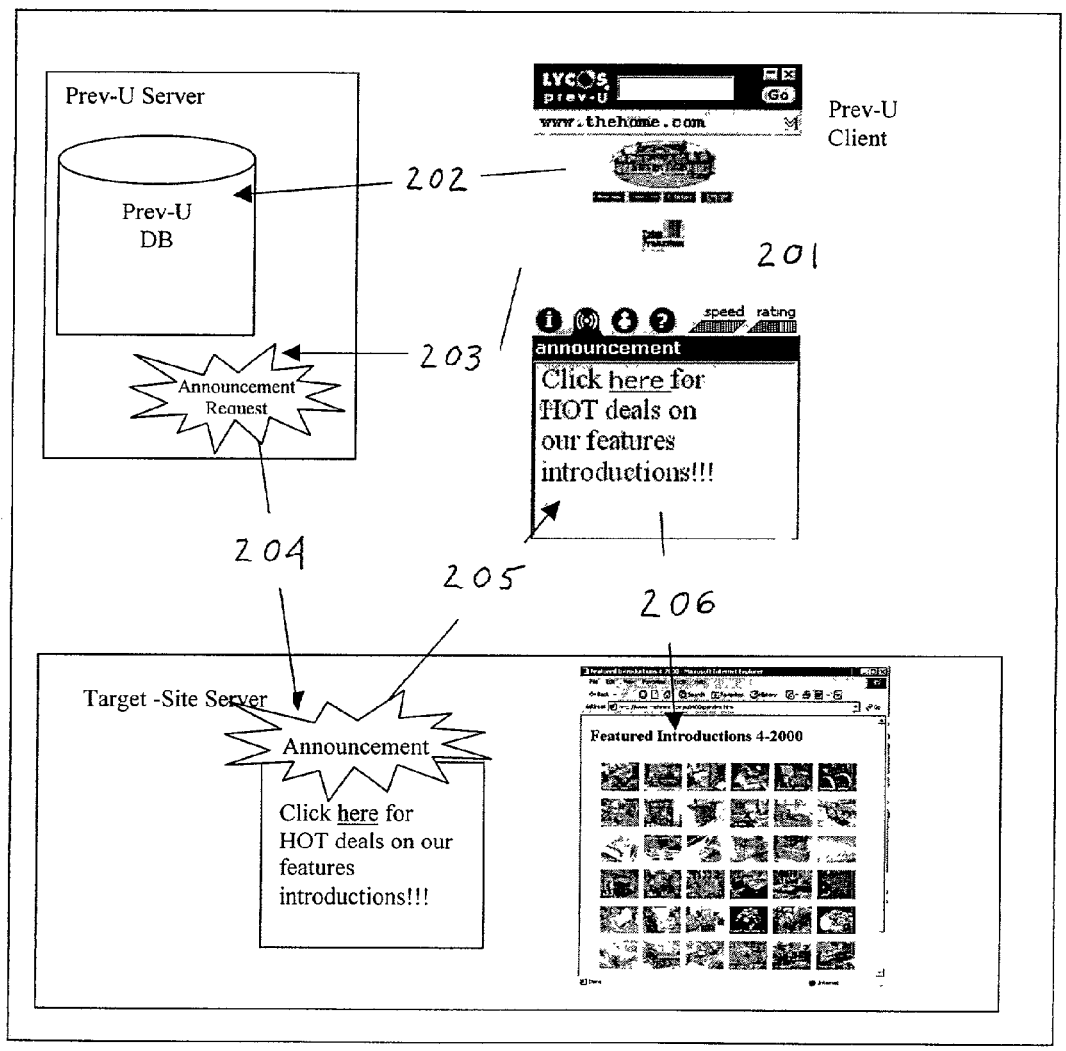
FIG. 11 is a flowchart of the announcement generation process.

The above process for generating announcement information is illustrated in FIG. 11, which is a diagram of the various steps in the announcement generation process. Referring now to FIG. 11, first at step 201, the user selects a website for which preview information is desired. Next, at step 202, the preview system checks its internal database to determine whether or not the selected website includes the announcement feature, e.g., whether or not the selected website has the announcement feature enabled. If the selected website includes the announcement feature, the preview system then creates an announcement request (step 203), which includes context parameters, such as user-id and search information.

The request for announcement information is then transmitted to the selected website (step 204), which in turn transmits back its announcement information which is ultimately presented to the user (step 205). Finally, at step 206, the user selects the website for which the announcement information was provided.

The announcement information according to the present invention is much more effective than on-site announcements at the web site, since the announcement information is being presented to prospective users to encourage them to visit the particular web site, rather than on-site announcements which, by definition, are provided to users already at the web site. Further, the announcement information of the present invention is also more effective than mailing lists or email lists, since such email messages are of limited context by nature since they are typically not being provided to the user during the specific time period in which the user is contemplating visiting a particular web site. Also, the announcement information of the present invention is far superior to conventional advertising approaches which are a very costly means of attracting potential users or purchasers.

While the invention has been particularly shown and described with reference to preferred embodiments thereof, it will be understood by those skilled in the art that various changes in form and details may be made therein without departing from the spirit and scope of the invention.

We claim:

1. A client system including a plurality of client applications for providing web site information, comprising:
   a user interface for forwarding and receiving preview requests which are input by a user;
   a page profile module operable to at least one of forward the preview information requests to a server and receive preview information from the server;
   a main controller for receiving the preview requests from the graphical user interface, said main controller processing the preview requests and forwarding said preview requests to the page profile module;
   a first interface for transmitting the preview information requests to the server;
   a real-time build module, said module receiving preview request information from the main controller and building preview information by accessing preview information sources including web page networks;
   a log module for recording client operation information;
   a configuration data module for determining a type of recording by the log module;
   said configuration data module storing client configuration information which defines client properties;
   a user profile module for processing a user specific portion of log files stored in the log module to determine user specific information; and
   a server management interface for providing communication of non-page-profile module information between the server and the client.

2. The system of claim 1, wherein the client properties include data build preferences, user preferences, and module configuration information for the client modules.

3. A system for providing web site information, comprising:
   a server for communicating with a client;
   a universal resource locator (URL) interface;
   an updater module; said URL interface and updater module storing lists of web site URLs and preview information generation rules for building preview information;
   a page profile module; said page profile module generating the preview information from preview information sources including web page networks and auxiliary data sources;
   a preview information archive for storing the preview information; said archive storing preview information which is at least one of generated by the page profile module and returned to the server;
   a configuration data module for storing settings for determining when the updater module generates preview information requests; and
   a monitor/configuration control module; said control module receiving user statistic information, user profile information and user configuration information.

4. The system of claim 3, further comprising:
a client interface for receiving the user statistic information, the user profiles information and the user configuration information;
an archive interface which interconnects the preview information archive to other servers;
a user database interface which receives the user statistic information, the user profile information and the user configuration information from the client interface; and
a log module which records the server activity based on log module configuration settings stored in the monitor/configuration control module.

5. The system of claim 4, wherein the user statistic information comprises general statistics of client application users.

6. The system of claim 5, wherein the general statistics of client application users comprises at least one of manner of use and amount of use information.

7. The system of claim 4, wherein the user profile information comprises specific profile information.

8. The system of claim 7, wherein the specific profile information is at least one of web sites visited and frequency of preview information use.

9. The system of claim 4, wherein the user configuration information comprises client application configuration data.

10. The system of claim 9, wherein the client application configuration data comprises user preferences.

11. The system of claim 3, wherein the page profile module generates preview information by accepting preview information requests from at least one of client applications and the updater module, executing the preview information request by generating specified preview information, and returning generated preview information to at least one of the client applications and the preview information archive.

12. The system of claim 11, wherein the preview information archive includes databases of preview information which were previously built by the page profile module and databases having data in a standard preview information format.

13. The system of claim 3, wherein the page profile module builds preview information by accessing preview information sources, extracting relevant preview information, and formatting extracted information into a standard preview information format.

14. The system of claim 13, wherein the preview information sources comprise at least one of web page networks and auxiliary data sources.

15. The system of claim 3, wherein the page profile module is operable to at least one of retrieve pre-built preview information from the preview information archive and build preview information in response to at least one of client applications and updater requests for preview information.

16. The system of claim 3, wherein page profile module configuration settings stored in a configuration data module determine which preview information to retrieve from the preview information archive, and which preview information the page profile module builds from preview information sources.

17. The system of claim 3, wherein the preview information archive is a preview information database which is generated by the page profile module in response to a client and requests for preview information from the updater.

18. The system of claim 17, wherein the preview information archive stores at least one of web page thumbnail images, meta data extracted from web page hyper text mark-up language code, titles, keywords and auxiliary data from sources external to a web page.

19. The system of claim 3, wherein the updater automatically updates the preview information archive by generating preview information requests which are sent to the page profile module.

20. The system of claim 3, wherein the updater automatically generates preview information requests based on lists of URLs stored in the URL interface.

21. The system of claim 3, further comprising:
a system administrator coupled to the monitor/configuration control module; said system administrator managing server activity by monitoring operation of the server, generating administrative statistics of the sever, and by modifying configuration settings of the server.

22. The system of claim 3, wherein the page profile module comprises:
a page profile retrieve module;
a page profile build module which extracts preview information from preview information sources;
a page profile interface module;
a world wide web interface module; and
an auxiliary interface module.

23. The system of claim 3, further comprising:
preview information sources from which the page profile module extracts preview information.

24. The system of claim 23, wherein the preview information comprises web page networks.

25. The system of claim 24, wherein the web page network are at least one of a world wide web and auxiliary data sources.

26. The system of claim 25, wherein the auxiliary data sources are web site information data bases.

27. The system of claim 22, wherein the page profile retrieve module receives retrieve requests from external modules, and generates preview information retrieve requests for page profile submodules and other external modules.

28. The system of claim 22, wherein the page profile retrieve module receives preview information request sent to the page profile module, and at least one of determines whether to build requested preview information and whether to retrieve the requested preview information from an archive of pre-built preview information.

29. The system of claim 28, wherein the pre-built information is at least one of information from the server, information from the server preview information archives and preview information databases supplied by web site owners.

30. The system of claim 22, wherein the page profile retrieve module comprises a plurality of sub-modules.

31. The system of claim 30, wherein the retrieve requests from external modules include preview information retrieve requests by the page profile retrieve module to the server and preview information retrieve requests by the page profile module to the preview information archive.

32. The system of claim 22, wherein the plurality of modules comprises at least one of an image retrieve module, a meta retrieve module, a real-time retrieve module and an auxiliary data retrieve module.

33. The system of claim 22, wherein the page profile build module comprises a plurality of sub-modules.

34. The system of claim 33, wherein the plurality of sub modules comprises at least one of an image build module, a meta build module, a real-time build module and an auxiliary build module.

35. The system of claim 34, wherein the plurality of sub-modules access outside information via a world wide web interface module.

36. A method for generating server preview information, comprising the following steps:
   sending a preview information request to a server to initiate generation of client preview information;
   forwarding the client preview information to a page profile module;
   determining whether the server is configured to save user ID and a URL field sent from a client;
   if the server is configured to save user ID and the URL field sent from a client, then sending the ID and URL to a user database interface for recording in the preview information archive; else determining whether the server is set to supplement a list of URLs stored in a URL interface;
   if the server is set to supplement a list of UIRLs stored in the URL interface, then sending the list of URLs for recording in the list of URLs stored in a URL interface, else generating a preview information package containing the client preview information which is returned to the client interface,
   determining whether new/updated preview information is stored in the preview information archive; and
   if new/updated preview information is stored in the preview information archive, then updating preview entries within the preview information archive, else forwarding the preview information package to a client application.

37. The method of claim 36, wherein the preview information contains the user ID and the URL field.

38. The method of claim 37, wherein the user ID is a client identifier and the URL field is a web address of a web site for the server to generate preview information.

39. The method of claim 36, wherein updating preview entries comprises the following steps:
   initiating a preview information date check in response to updater rules, configuration settings, and external prompts from an external sources;
   retrieving a last time that an update of types of data from a preview information archive occurred;
   accessing a specified URL to determine a last update time of a specified URL;
   comparing update times to determine if data content of a web page is more recent than the data content of a web page in the preview information archive;
   if the data content of the web page is as recent as the data content of the web page in the preview information archive terminating all comparisons, else issuing a preview information request to indicate that the data is no longer current;
   building new preview information for the specified URL; and
   storing new preview information in the preview information archive.

40. The method of claim 39, wherein the preview information request indicates which types of data are no longer current.

41. The method of claim 39, wherein said step of building new preview information for the specified URL comprises the following steps:
   executing the preview information request, accesses preview information sources, and
   extracting preview information specified types of data.

42. The method of claim 39, wherein the preview information in the preview information archive is stored along with new dates of preview information.

43. The method of claim 39, further comprising the following step:
   automatically updating web site preview information stored in a preview information archive for web site URLs stored in an URL interface module.

44. The method of claim 39, wherein the preview information comprises at least one of a web site URL which is updated and the types of data which are updated.

45. The method of claim 43, wherein the type of data is at least one of a thumbnail image of a web site, meta data, real-time data and auxiliary data.

46. The method of claim 38, further comprising the following steps:
   issuing a URL modification request;
   determining whether the URL modification request includes a remove URL instruction;
   if the URL modification request includes the remove URL instruction, then deleting a specified URL and preview information associated with the specified URL from a URL interface list and the preview information archive, else adding the specified URL to the URL interface list as a new URL;
   forwarding the added URL to the preview information archive for creation of a new URL entry having empty preview information data;
   determining whether the sever is configured to generate preview information for the new URL entry in the URL interface list; and
   if the sever is set to generate preview information for the new URL entry in the URL interface list, then activating an updater such that a preview information request is generated, else terminating the a URL modification request.

47. The method of claim 42, further comprising the following steps:
   activating a monitor/configuration control module,
   retrieving current configuration data from the configuration data module;
   displaying the configuration data to a system administrator;
   issuing configuration modification instructions to the monitor/configuration control module to modify the configuration data; and
   storing new configuration control setting upon completion of the configuration modification instructions.

48. The method of claim 47, wherein said activation step is achieved by a system administrator via one of the server, Java script and Java applets.

49. The method of claim 42, further comprising the following steps of:
   monitoring the system to detect at least one of malfunctions, loading problems and connection problems; and,
   forwarding an alarm indication.

50. The method of claim 49, wherein said alarm comprises at least one of pop-up windows, an email, a phone beeper and a phone message.

* * * * *